(12) United States Patent
Ushiwata et al.

(10) Patent No.: US 7,805,042 B2
(45) Date of Patent: Sep. 28, 2010

(54) FLEXIBLE OPTICAL INTERCONNECTION STRUCTURE AND METHOD FOR FABRICATING SAME

(75) Inventors: Takami Ushiwata, Hitachi (JP); Koki Hirano, Hitachinaka (JP); Hiroki Yasuda, Mito (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 12/292,933

(22) Filed: Dec. 1, 2008

(65) Prior Publication Data
US 2009/0263077 A1 Oct. 22, 2009

(30) Foreign Application Priority Data
Apr. 22, 2008 (JP) ............................. 2008-111460

(51) Int. Cl.
*G02B 6/10* (2006.01)
(52) U.S. Cl. ...................................................... 385/129
(58) Field of Classification Search ................. 385/129
See application file for complete search history.

(56) References Cited

U.S. PATENT DOCUMENTS

| 4,836,639 A * | 6/1989 | Shamoto et al. ............. 385/109 |
| 7,272,282 B1 * | 9/2007 | Seddon et al. ............. 385/106 |
| 2008/0118210 A1 * | 5/2008 | Seddon et al. ............. 385/114 |

FOREIGN PATENT DOCUMENTS

| JP | 2006-323316 | 11/2006 |
| JP | 2006-339173 | 12/2006 |

* cited by examiner

*Primary Examiner*—Sung H Pak
(74) *Attorney, Agent, or Firm*—McGinn IP Law Group, PLLC (57) ABSTRACT

A flexible optical interconnection structure has a plurality of layers including an optical waveguide made of a core and a clad. The core is disposed to include a neutral surface that is not affected by expansion or contraction by bending. Alternatively, when the neutral surface is position outside the core, the core is disposed to satisfy $\Delta y \leq 0.03 \times R$, in which $\Delta y$ is a distance between the neutral surface and a surface of the core at a side near the neutral surface, and R is a curvature radius of an innermost surface of the flexible optical interconnection structure in the bent state.

16 Claims, 6 Drawing Sheets

FLEXIBLE OPTICAL INTERCONNECTION STRUCTURE AND METHOD FOR FABRICATING SAME

The present application is based on Japanese Patent Application No. 2008-111460 filed on Apr. 22, 2008, the entire contents of which are incorporated herein by reference.

BACKGROUND OF THE INVENTION

1. Field of the Invention

The present invention relates to a flexible optical interconnection structure and a method for fabricating the same, more particularly, to a flexible optical interconnection structure and a method for fabricating the same with improved mechanical reliability.

2. Related Art

With the expansion of services and applications for handling a large capacity of data such as images in the electronic equipment such as personal computers, cellular phones and television sets, the developments of high-speed and large-capacity data communication technologies are being promoted. In this technical environment, optical interconnection attracts the attention for enabling high-speed and large-capacity data communication within the electronic equipment or among a set of electronic equipments as recited above, as well as within an electronic circuit board or between a plurality of the electronic circuit boards.

Conventionally, electric interconnections (wirings) have been used for connection of signal, transmission line among the electronic circuit boards. Particularly for parts requiring the flexibility within the electronic equipment or among the electronic circuit boards, the use of electric interconnections using a Flexible Printed Circuit (FPC) with multiple cores and flexibility or a thin coaxial cable has been researched.

However, problems such as crosstalk, electromagnetic interference, band limitation, loss due to high frequency in signal transmission using the electric interconnections appear in accordance with speedup of the signal transmission. The transmission capacitance per one channel (one core) for the electric interconnection is at most several Gbps, which requires additional channels or cores and waveform correction circuits in order to increase the signal speed in the future. However, as the number of cores increases, the interconnection cost may increase as well as the interconnection volume increases, which may suffer a wiring space shortage. In order to speedup the signal transmission, it is required to implement the waveform correction circuit for correcting the waveform turbulence near a terminal end of the electric interconnection caused by the signal delay, etc. in the electric interconnection. Additional waveform correction circuit may increase the overall cost for the electric interconnection because the device cost for the waveform correction circuits itself and its mount cost may be added. In addition, the electric interconnection behaves as an antenna by itself and may irradiate electromagnetic waves outside and may generate electromagnetic noises due to incoming electromagnetic waves.

A high-speed transmission of greater than several Gbps, which is irrealizable in the electric interconnection without causing the problems such as crosstalk, electromagnetic interference, can be realized by optical interconnection using a light (optical signal) in place of the electric signal as a transmission medium. The optical interconnection for transmitting signals faster than the electric interconnection is mainly used for the long-distance information transmission, for example, intercontinental and inter-city networks which use optical interconnections for single mode transmission with less delay in the optical pulse. As for the short-distance LAN (Local Area Network), from the view point of easiness in connectivity of optical interconnections, multi mode transmission is mainly used, since the optical connection between the equipments is easy because of a large core diameter. Such high-speed transmission is realized by using the optical fiber, and a single mode fiber or a multimode fiber corresponding to respective transmission modes is used.

On the other hand, as to the interconnection within the equipment, among the electric circuit boards, and within the electric circuit board, the optical transmission with the use of an optical waveguide has been researched. For realizing such optical transmission, numerous multimode optical waveguides mainly made of a polymer have been developed. In each of these optical waveguides, a photoelectric conversion element for converting an electrical signal into an optical signal and vice versa is provided, and the electrical signal is converted to the optical signal and input to the optical waveguide, and the optical signal transmitted through the optical waveguide is converted again to the electrical signal. A light emitting element and a driver for driving the light emitting element are used for converting the electrical signal into the optical signal. A light receiving element and an amplifier for amplifying a received signal are used for converting the optical signal into the electrical signal.

The light emitting element, the light receiving element, the driver, and the amplifier are surface-mounted on the optical interconnection structure, in which an emitting direction of a light emitted from the light emitting element and a longitudinal direction of the optical waveguide (orientation of the light spread in the optical waveguide) are arranged to be perpendicular to each other. In addition, the longitudinal direction of the optical waveguide and a direction of a light output from the optical waveguide and incident to the light receiving element are arranged to be perpendicular to each other. Accordingly, it is necessary to provide an optical path conversion part for converting (changing) a direction of an optical path by 90° in a light input part from the light emitting element to the optical waveguide and a light output part from the optical waveguide to the light receiving element. So as to realize the optical path conversion parts, following technique is used. Namely, each of the light input part and the light output part of a core of the optical waveguide is provided with a surface with an angle of 45° (45° surface) by processing, and the light is reflected at an angle of 90° by the 45° surface as a mirror surface.

In the case that the signal is transmitted through the optical interconnection within the equipment having a movable element or among the electric circuit boards, the optical interconnection structure should be sustainable for bending or deformation. Therefore, a flexible optical interconnection structure is lively developed. For realizing the signal transmission in a hinge part or a movable device of a portable telephone, a personal computer, and the like, the optical interconnection structure with the use of polymer waveguide is mainly developed.

When the signal is transmitted through the flexible optical interconnection structure using the polymer waveguide within the equipment having the movable element or among the electric circuit boards, the flexible optical interconnection structure should be sustainable for repeated bending or deformation. Japanese Patent Laid-Open No. 2006-323316 (JP-A-2006-323316) discloses a flexible optical interconnection structure using a polymer which is excellent in bending property such as polyimide or norbornene.

As to the use of the flexible optical interconnection structure, there are two cases, namely, the flexible optical interconnection structure is used as an interconnection consisted of the optical waveguide, and the optical waveguide is laminated together with other parts and electrical interconnection (wiring). In the latter case, a metal wiring for electric power transmission or electrical signal transmission, a base material film for making the metal wiring, and a backing plate for improving a strength of the flexible optical interconnection structure and for preventing the optical interconnection structure from damages due to abrasion or breakage are used in addition to the optical waveguide.

When the flexible optical interconnection structure is not symmetrical with respect to a center plane in its thickness (depthwise) direction, a neutral surface (a virtual surface that is not affected by the expansion and contraction by bending) is shifted from a center position in the thickness direction, since these various parts comprise various materials in which elastic modulus and thickness thereof are different from each other. When the flexible optical interconnection structure is bent, a tensile stress is applied to an outer part of a bent part (namely, a part provided outside with respect to the neutral surface) so that the material is expanded, while a compressive stress is applied to an inner part of the bent part (namely, a part provided inside with respect to the neutral surface) so that the material is contracted. A part without a strain due to the expansion and contraction is the neutral surface.

In the polymer waveguide, a rigid structure such as benzene ring is usually introduced into the core, so as to increase a refractive index of the core compared with that of a clad. Therefore, the material of the core has an elastic modulus greater than that of the clad, namely, the core comprises a hard and fragile material compared with the clad. The material having a large elastic modulus is disadvantageous in improving the repeated bending property, so that it is preferable that the tensile stress and the compressive stress applied to the polymer waveguide are as small as possible. Therefore, it is required that the core having the large elastic modulus is positioned at the neutral surface or in vicinity of the neutral surface in the flexible optical interconnection structure.

For reducing the tensile stress and the compressive stress to be applied to the flexible optical interconnection structure, there is a technique of reducing the overall thickness of the flexible optical interconnection structure. However, there is a restriction in a lower limit of the thickness of the flexible optical interconnection structure, when the aforementioned elements such as metal wiring, backing plate and the like are added, as described in Japanese Patent Laid-Open No. 2006-339173 (JP-A-2006-339173).

The flexible optical interconnection structure to be used in the movable part within the equipment and between the circuit boards should be excellent in the repeated bending property. If not, a malfunction such as breakage often occurs in the core part that is particularly inferior in the bending property in the flexible optical interconnection structure.

SUMMARY OF THE INVENTION

Therefore, the object of the present invention is to provide a flexible optical interconnection structure and a method for fabricating the same with improved mechanical reliability (bending property).

According to a first feature of the invention, a flexible optical interconnection structure comprises:

a plurality of layers including an optical waveguide comprising a core and a clad, wherein the core is disposed to include a neutral surface that is not affected by expansion or contraction by bending.

In the flexible optical interconnection structure, the neutral surface may be located at a position distant by a distance yn from an innermost surface when bent, the distance yn is expressed by a formula (1):

$$y_n = \frac{\sum_{i=1}^{n} E_i t_i y_i}{\sum_{i=1}^{n} E_i t_i} \quad (1)$$

wherein a distance $y_i$ between a surface layer and a center of i-th layer (i is a natural number) in a thickness direction, an elastic modulus of the i-the layer is $E_i$, and a thickness of the i-the layer is $t_i$.

In the flexible optical interconnection structure, the layers may include an electric wiring layer.

In the flexible optical interconnection structure, the optical waveguide may comprise a polymer waveguide.

In the flexible optical interconnection structure, the optical waveguide may comprise an optical fiber.

In the flexible optical interconnection structure, a metal layer may be provided at a side opposite to the electric wiring layer.

According to a second feature of the invention, a flexible optical interconnection structure comprises:

a plurality of layers including an optical waveguide comprising a core and a clad, wherein the core is disposed to satisfy:

$$\Delta y \leq 0.03 \times R,$$

wherein $\Delta y$ is a distance between a neutral surface that is not affected by expansion or contraction by bending and a surface of the core at a side near the neutral surface, and R is a curvature radius of an innermost surface of the flexible optical interconnection structure in the bent state.

In the flexible optical interconnection structure, the neutral surface may be located at a position distant by a distance yn from an innermost surface when bent, the distance yn is expressed by a formula (1):

$$y_n = \frac{\sum_{i=1}^{n} E_i t_i y_i}{\sum_{i=1}^{n} E_i t_i} \quad (1)$$

wherein a distance $y_i$ between a surface layer and a center of i-th layer (i is a natural number) in a thickness direction, an elastic modulus of the i-the layer is $E_i$, and a thickness of the i-the layer is $t_i$.

In the flexible optical interconnection structure, the layers may include an electric wiring layer.

In the flexible optical interconnection structure, the optical waveguide may comprise a polymer waveguide.

In the flexible optical interconnection structure, the optical waveguide may comprise an optical fiber.

In the flexible optical interconnection structure, a metal layer may be provided at a side opposite to the electric wiring layer.

In the flexible optical interconnection structure, the neutral surface may be positioned outside the core.

According to a third feature of the invention, a method for fabricating a flexible optical interconnection structure comprises:

providing a plurality of layers including an optical waveguide comprising a core and a clad;

calculating a distance yn from an innermost surface when bent to a neutral surface that is not affected by expansion or contraction by bending, based on an elastic modulus and a thickness of each of the layers;

calculating the position of the neutral surface based on the distance yn; and controlling the position of the neutral surface by adjusting the elastic modulus and the thickness of each of the layers, such that the core includes the neutral surface.

In the method for fabricating the flexible optical interconnection structure, the distance yn may be calculated by a formula (1):

$$y_n = \frac{\sum_{i=1}^{n} E_i t_i y_i}{\sum_{i=1}^{n} E_i t_i} \quad (1)$$

wherein a distance $y_i$ between a surface layer and a center of i-th layer (i is a natural number) in a thickness direction, an elastic modulus of the i-the layer is $E_i$, and a thickness of the i-the layer is $t_i$.

According to a fourth feature of the invention, a method for fabricating a flexible optical interconnection structure comprises:

providing a plurality of layers including an optical waveguide comprising a core and a clad;

calculating a distance yn from an innermost surface when bent to a neutral surface that is not affected by expansion or contraction by bending, based on an elastic modulus and a thickness of each of the layers;

calculating the position of the neutral surface based on the distance yn; and controlling the position of the neutral surface by adjusting the elastic modulus and the thickness of each of the layers, such that the wherein the core is disposed to satisfy:

$\Delta y \leq 0.03 \times R$, wherein $\Delta y$ is a distance between the neutral surface and a surface of the core at a side near the neutral surface, and R is a curvature radius of an innermost surface of the flexible optical interconnection structure in the bent state.

In the method for fabricating the flexible optical interconnection structure, the distance yn may be calculated by a formula (1):

$$y_n = \frac{\sum_{i=1}^{n} E_i t_i y_i}{\sum_{i=1}^{n} E_i t_i} \quad (1)$$

wherein a distance $y_i$ between a surface layer and a center of i-th layer (i is a natural number) in a thickness direction, an elastic modulus of the i-the layer is $E_i$, and a thickness of the i-the layer is $t_i$.

ADVANTAGE OF THE INVENTION

The present invention provides the following advantage.
(1) It is possible to improve the mechanical reliability (bending property).

BRIEF DESCRIPTION OF THE DRAWINGS

Next, preferred embodiments according to the present invention will be explained in conjunction with appended drawings:

FIGS. 1A and 1B are schematic diagrams of a flexible optical interconnection structure in a first preferred embodiment according to the invention, wherein

FIGS. 2A and 2B are schematic diagrams of a flexible optical interconnection structure in a second preferred embodiment according to the invention, wherein

FIGS. 3A and 3B are schematic diagrams of a flexible optical interconnection structure in a third preferred embodiment according to the invention, wherein

FIGS. 5A and 5B are schematic diagrams of a flexible optical interconnection structure in a fourth preferred embodiment according to the invention, wherein FIGS. 6A and 6B are explanatory diagrams for showing a method for calculating the distance $\Delta y$ in the first to third preferred embodiments, wherein

DETAILED DESCRIPTION OF THE PREFERRED EMBODIMENTS

Next, the preferred embodiments according to the present invention will be explained below in more detail in conjunction with the appended drawings.

First Preferred Embodiment

Figure 1A:
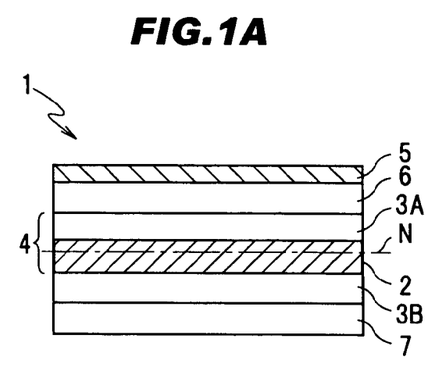
FIG. 1A is a side cross sectional view thereof and FIG. 1B is a lateral cross sectional view thereof.
Figure 1B:
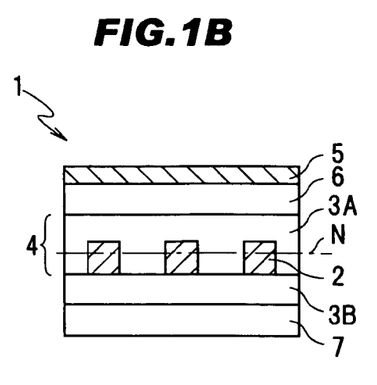

FIGS. 1A and 1B are schematic diagrams of a flexible optical interconnection structure in the first preferred embodiment according to the invention, in which FIG. 1A is a side cross sectional view thereof and FIG. 1B is a lateral cross sectional view thereof.

As shown in FIGS. 1A and 1B, a flexible optical interconnection structure 1 comprises an optical waveguide layer 4 comprising a core 2 and a clad 3 (including a first clad 3A and a second clad 3B), in which the core 2 is arranged to include a neutral surface N that is not expanded or contracted by the bending.

In more concrete, the flexible optical interconnection structure 1 of the first preferred embodiment comprises a copper wiring layer 5, a copper wiring base material film 6 comprising a polyimide, the optical waveguide layer 4 including the first clad 3A, the core 2, and the second clad 3B, and a cover film 7 comprising a polyimide.

In the first preferred embodiment as shown in FIGS. 1A and 1B, the core 2 is arranged such that the core 2 includes the neutral surface N between both sides of the core 2 in the thickness direction.

(Theoretical Basis for Determining the Position of the Core)

Next, the reason for determining the position of the core such that the core 2 includes the neutral surface N will be explained below.

In the bending operation or the like, the tensile stress and the compressive stress are applied to the flexible optical interconnection structure 1. The repeatedly applied stresses may cause the malfunction such as breakage from a mechanically weak part due to fatigue in the flexible optical interconnection structure 1. When the flexible optical interconnection structure 1 is bent, the largest tensile stress is applied to an outermost surface of the flexible optical interconnection structure 1 in the bending state. As advanced from the outermost surface to the inside along the thickness direction, the tensile stress decreases and finally changes into the compressive stress. The turning point of changing from the tensile stress to the compressive stress is the neutral surface N. At an inside part of the bent structure, the largest compressive stress is applied to a reference surface S corresponding to an innermost part of the bent structure.

In the flexible optical interconnection structure 1 in the first preferred embodiment, the core 2 is located at the neutral surface N. Herein, "the core 2 is located at the neutral surface N" means that the core 2 is arranged such that the core 2 includes the neutral surface N.

It is usually contemplated that the core, the clad, the cover film for protecting the core and the clad, and an adhesive layer for adhering these layers are laminated in the flexible optical interconnection structure comprising the polymer waveguide. Further, materials used for respective layers are usually different in the thickness and the elastic modulus. The core in the optical waveguide is often made of a material including a rigid structure such as benzene ring, so as to increase the refractive index of the core. Therefore, the core tends to be a hard and fragile part. In the conventional flexible optical interconnection structure fabricated without considering the stress applied at the time of bending, it is supposed that malfunction such as crack, breakage occurs in the core having a small response to the stress (e.g. expansion), when a large tensile stress is applied to the core.

(Method for Fabricating the Flexible Optical Interconnection Structure)

As described above, there are two cases in the use of the flexible optical interconnection structure 1, namely, the flexible optical interconnection structure is used as the optical interconnection consisted of the optical waveguide, and the optical waveguide is laminated together with other parts and electrical interconnection (wiring). In the case that the optical waveguide is laminated together with the other parts, the metal wiring (the copper wiring layer 5) for electric power transmission or electrical signal transmission, the base material film (the copper wiring base material film 6) for making the metal wiring, and the backing plate (the cover film 7) for improving a strength of the flexible optical interconnection structure 1 and for preventing the optical interconnection structure 1 from damages due to abrasion or breakage are used in addition to the optical waveguide layer 4 (the core 2 and the clad 3). Adhesive layers (not shown) for attaching the respective layers to each other may be also used. These materials of the respective layers are different in the elastic modulus and the thickness.

Next, the method for determining the neutral surface N will be described below.

In the flexible optical interconnection structure 1, a distance $y_i$ between a surface layer (an uppermost surface layer or a lowermost surface layer in the drawings) and the i-th layer ("i" is a natural number and counted in the order starting from the surface layer) is expressed as follows:

$$y_1 = t_1/2 (i=1), \text{ or}$$

$$y_i = \sum_{i=1}^{i-1} t_i + t_i/2$$

wherein i≧2, an elastic modulus of the i-the layer is $E_i$, and a thickness of the i-the layer is $t_i$.

A distance yn between the neutral surface N and the reference surface S (an innermost surface when bent) in the flexible optical interconnection structure 1 is expressed by following formula (1):

$$y_n = \frac{\sum_{i=1}^{n} E_i t_i y_i}{\sum_{i=1}^{n} E_i t_i} \tag{1}$$

The flexible optical interconnection structure 1 in the first preferred embodiment is fabricated by arranging the core 2 of the optical waveguide 4 at a position distant from the reference S by the distance yn (namely, at the neutral surface N).

According to this structure, it is possible to suppress the malfunction such a breakage of the core 2 due to the bending and the like.

Further, it is possible to determine the neutral surface N at an arbitrary position in the flexible optical interconnection structure 1 by changing the elastic modulus and the thickness of each layer in the flexible optical interconnection structure 1. By arranging the core 2 at the neutral surface N at the arbitrary position, it is possible to obtain the flexible optical interconnection structure 1 with the excellent bending property.

(The Material and the Manufacturing Method of the Respective Layers)

As the optical waveguide 4 in the flexible optical interconnection structure 1, a polymer waveguide may be used.

The polymer waveguides using various materials and various manufacturing methods are developed. In the present invention, any kind of materials and manufacturing methods may be used for fabricating the polymer waveguide.

As for the polymer material, various materials such as elastomer, polyimide, and a polymer in which an inorganic composition is filled may be used. The elastic modulus of the polymer material is usually about 0.01 to 8 GPa.

As for the method for manufacturing the polymer waveguide, direct exposure method, dry etching method, photo-bleach method, stamper method or the like may be used in accordance with the materials to be used.

As for the electric wiring base material film (the copper wiring base material film) for laminating the polymer waveguide together with the electric wiring (the copper wiring layer 5) in the flexible optical interconnection structure 1, various materials such as polyimide, PET (polyethylene terephthalate), liquid crystal polymer, waveguide material itself and the like may be used.

As for the adhesive layer (not shown) for attaching the respective layers, the adhesive material is not limited.

When the flexible optical interconnection structure 1 is consisted of the polymer materials, there is not a large difference in the elastic modulus of the respective layers, so that a tolerance of the position of the core 2 is large. By locating the core 2 at the neutral surface N, the reliability in the bending property can be further improved.

Effect of the First Preferred Embodiment

According to the flexible optical interconnection structure 1 in the first preferred embodiment, in which the core 2 is located at the neutral surface N, the strain caused by the tensile stress and the compressive stress applied to the core 2 is smaller than that in the conventional devices, thereby reducing the malfunction due to the strain.

Further, the flexible optical interconnection structure 1 in the first preferred embodiment comprises a plural layers including the core 2, the clad 3, and the electric wiring comprising the metal and the like (the copper wiring layer 5), in which the core 2 is located at the neutral surface N. When the metal wiring (the copper wiring layer 5) is included in the flexible optical interconnection structure 1, the position of the neutral surface N is greatly influenced by a thickness of the metal wiring, since the elastic modulus of the metal is greater by one or two digits than those of the other polymer layers. However, according to the invention, even in the flexible optical interconnection structure 1 comprising the metal wiring, it is possible to suppress the malfunction of the core by locating the core 2 at the neutral surface N.

Second Preferred Embodiment

Figure 2A:
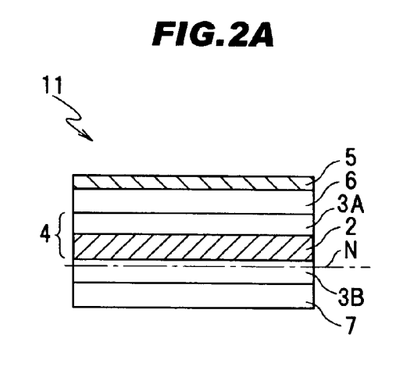
FIG. 2A is a side cross sectional view thereof and FIG. 2B is a lateral cross sectional view thereof at the time of bending.
Figure 2B:
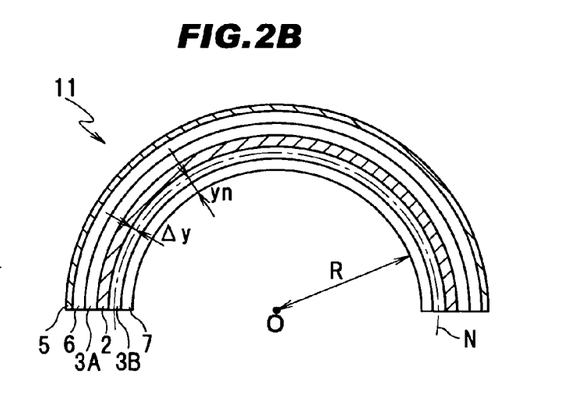

FIGS. 2A and 2B are schematic diagrams of a flexible optical interconnection structure in the second preferred embodiment according to the invention, in which FIG. 2A is a side cross sectional view thereof and FIG. 2B is a lateral cross sectional view thereof at the time of bending.

As shown in FIGS. 2A and 2B, a flexible optical interconnection structure 11 comprises an optical waveguide layer 4 comprising a core 2 and a clad 3 (including a first clad 3A and a second clad 3B), in which the respective layers are arranged such that the core 2 does not include a neutral surface N.

In FIG. 2B, the flexible optical interconnection structure 11 is bent in a curvature radius R (μm) around a center point O such that the reference surface S (an innermost surface) is located inside the bent structure. The neutral surface N is located in the second clad 3B at the side of the reference surface S.

In the case that the core 2 does not include the neutral surface N, the flexible optical interconnection structure 11 is formed such that a distance Δy (μm) between the neutral surface N and a surface of the core 2 at a side near to the neutral surface N is not greater than 0.03 times of the curvature radius R. The arrangement of the respective layers of the flexible optical interconnection structure 11 will be described later.

As shown in FIG. 2A, when the core 2 does not include the neutral surface N, the core 2 is located to satisfy the following formula (2):

$$\Delta y \leq 0.03 \times R \quad (2)$$

wherein Δy (μm) is a distance between the neutral surface N and the surface of the core 2 at the side near to the neutral surface N, and R (μm) is a curvature radius of the reference surface S in the bent state.

(Theoretical Basis for Determining the Distance Δy)

Next, the reason for determining the distance Δy between the neutral surface N and the surface of the core 2 at the side near to the neutral surface N based on the relationship with the curvature radius R will be explained below.

In the flexible optical interconnection structure 11 in the second preferred embodiment, the core 2 is located in vicinity of the neutral surface N. Herein, "the core 2 is located in vicinity of the neutral surface N" means that the core 2 does not include the neutral surface N and that the core 2 is arranged such that the distance Δy (μm) between the neutral surface N and the surface of the core 2 at the side near to the neutral surface N is not greater than 0.03 times of the curvature radius R of the reference surface S.

As shown in FIG. 2A, when the core 2 does not include neutral surface N, a tolerance of the distance Δy (μm) between the neutral surface N and the surface of the core 2 at the side near to the neutral surface N is varied in accordance with the curvature radius R required for the flexible optical interconnection structure 11.

As shown in FIG. 2B, a distance between the neutral surface N and the reference surface S that is an innermost surface to which the compressive stress is applied at maximum when the flexible optical interconnection structure 11 is bent in the curvature radius R (μm) around the center point O is determined as a distance yn (μm). At this time, a strain ε acting on a surface distant from the neutral surface N by the distance Δy (μm) is expressed by a formula (3):

$$\varepsilon = \frac{\Delta y}{R + y_n}. \quad (3)$$

In general, the curvature radius R is not less than 1000 μm in an application for the interconnection between the equipments and the like, in which the flexible optical interconnection structure is used. Further, since a thickness of the flexible optical interconnection structure is usually about 100 to 300 μm, the distance Δy can be expressed by formula (4) by approximating the formula (3) based on "R>>yn":

$$\Delta y = \varepsilon R \quad (4)$$

If the tensile stress which expands the core by 3% is applied repeatedly for 1000 times or more, the malfunction such as the breakage may occur. Therefore, it is preferable that the strain ε is not greater than 0.03. Accordingly, it is preferable that the core 2 is arranged such that the distance Δy (μm) between the neutral surface N and the surface of the core 2 at the side near to the neutral surface N satisfies the formula (2), which depends on the curvature radius R (μm) of the flexible optical interconnection structure 1.

The flexible optical interconnection structure 11 in the second preferred embodiment is fabricated by arranging the core 2 of the optical waveguide 4 to satisfy the condition that:

$$\Delta y \leq 0.03 \times R \quad (2),$$

wherein Δy (μm) is the distance between the neutral surface N and the surface of the core 2 at the side near to the neutral surface N, and R (μm) is the curvature radius of the reference surface S in the bent state.

According to this structure, it is also possible to suppress the malfunction such a breakage of the core 2 due to the bending and the like.

Further, it is possible to determine the neutral surface N at an arbitrary position in the flexible optical interconnection structure 11 by changing the elastic modulus and the thickness of each layer in the flexible optical interconnection structure 11. By arranging the core 2 in vicinity of the neutral surface N at the arbitrary position, it is possible to obtain the flexible optical interconnection structure 1 with the excellent bending property.

Effect of the Second Preferred Embodiment

According to the second preferred embodiment, it is possible to suppress the malfunction due to the bending even though the core 2 does not include the neutral surface N. Therefore, it is possible to provide the freedom of design for the flexible optical interconnection structure 11.

Third Preferred Embodiment

Figure 3A:
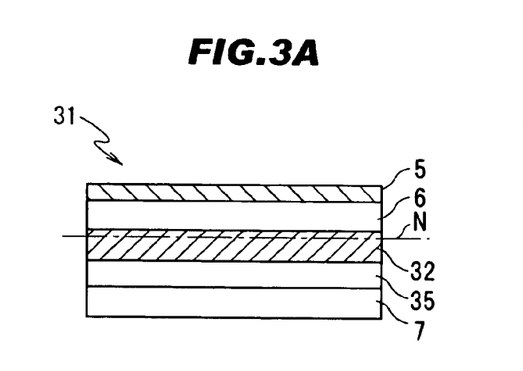
FIG. 3A is a side cross sectional view thereof and FIG. 3B is a lateral cross sectional view thereof.
Figure 3B:
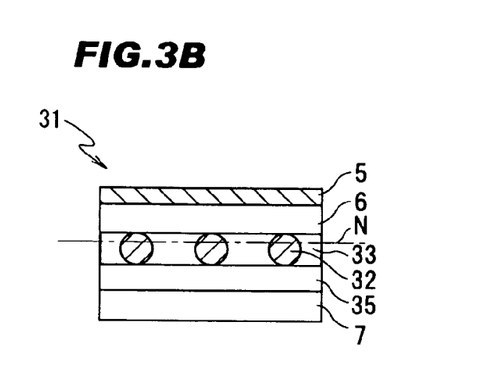

FIGS. 3A and 3B are schematic diagrams of a flexible optical interconnection structure in the third preferred embodiment according to the invention, in which FIG. 3A is a side cross sectional view thereof and FIG. 3B is a lateral cross sectional view thereof.

As shown in FIGS. 3A and 3B, a flexible optical interconnection structure 31 comprises five layers including a copper wiring layer 5, a copper wiring base material film 6, an optical fiber 32, an adhesive 33, a supporting layer 35, and a cover film 7. Namely, the flexible optical interconnection structure 31 has a configuration in that the optical fiber 32 is laminated between the copper wiring base material film 6 and the cover film 7 with the use of the adhesive 33.

The flexible optical interconnection structure 31 in the third preferred embodiment is different from the flexible optical interconnection structure 1 in the first preferred embodiment in that the optical fiber 32, the adhesive 33 and the supporting layer 35 are provided in place of the optical waveguide layer 4 (the first clad 3A, the core 2, and the second clad 3B).

In the third preferred embodiment, it is possible to locate the optical fiber 32 on a film provided as the supporting layer 35 for supporting the optical fiber 32 by laminate processing or V-groove processing.

Effect of the Third Preferred Embodiment

According to the third preferred embodiment, since it is possible to use the commercialized optical fiber in place of the polymer waveguide, the fabrication process can be simplified. Further, even in the case that the optical fiber 32 comprises a glass fiber which is hard, fragile and weak in bending, it is possible to suppress the malfunction due to the bending by locating a core of the optical fiber 32 at the neutral surface N or in vicinity of the neutral surface N in the flexible optical interconnection structure 31.

Fourth Preferred Embodiment

Figure 5A:
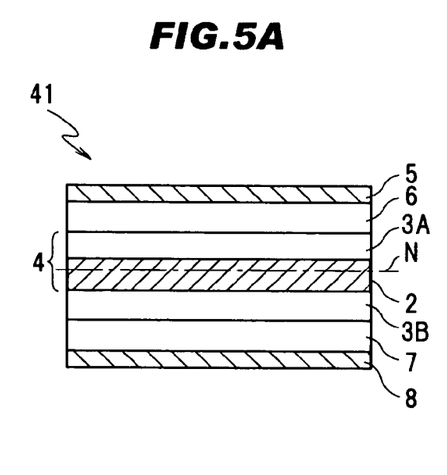
FIG. 5A is a side cross sectional view thereof and FIG. 5B is a lateral cross sectional view thereof.
Figure 5B:
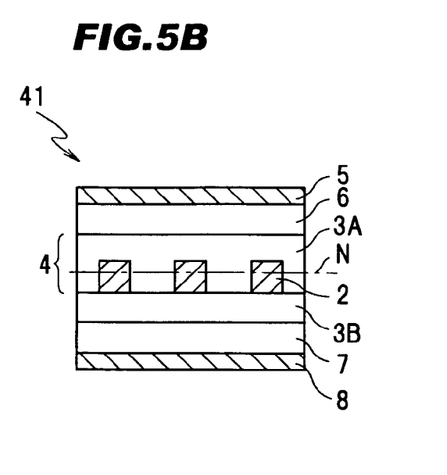

FIGS. 5A and 5B are schematic diagrams of a flexible optical interconnection structure in the fourth preferred embodiment according to the invention, in which FIG. 5A is a side cross sectional view thereof and FIG. 5B is a lateral cross sectional view thereof.

As shown in FIGS. 5A and 5B, a flexible optical interconnection structure 41 comprises a copper wiring layer 5, a copper wiring base material film 6 comprising a polyimide, an optical waveguide layer 4 including a first clad 3A, a core 2, and a second clad 3B, a cover film 7 comprising a polyimide, and a counteracting metal layer 8.

The flexible optical interconnection structure 41 in the fourth preferred embodiment is different from the flexible optical interconnection structure 1 in the first preferred embodiment in that the flexible optical interconnection structure 41 further comprises the counteracting metal layer 8 which is provided at the side opposite to the copper wiring layer 5.

When two layers having the different elastic modulus and the same thickness are adhered to each other, the neutral surface N is shifted toward the layer having the elastic modulus greater than another one. By controlling the displacement of the neutral surface N (namely, arranging the neutral surface N at a target position), it is possible to locate the neutral surface N within the core 2.

However, when the metal wiring (the copper wiring layer 5) is provided at the surface of the flexible optical interconnection structure, the neutral surface N tends to be shifted to the metal wiring having a large elastic modulus. This tendency is remarkable as the thickness of the electric wiring is increased. In an extreme case, the neutral surface N is located in the electric wiring. In such a case, it is possible to displace the neutral surface N toward a middle part of the flexible optical interconnection structure 41, by providing the counteracting metal layer 8 comprising a metal foil or the like having the elastic modulus similar to the electric wiring at the outermost layer surface, at the opposite side of the electric wiring or in the middle layers of the flexible optical interconnection structure 41.

Effect of the Fourth Preferred Embodiment

According to the fourth preferred embodiment, it is possible to arrange the core 2 in the middle part of the flexible optical interconnection structure 41. Further, the counteracting metal layer 8 may be used for other purposes such as heat radiation, electric wiring. By controlling the elastic modulus and the thickness of the counteracting metal layer 8, it is possible to arbitrarily design the position of the neutral surface N.

EXAMPLES

Samples of the flexible optical interconnection structure 1, 11, and 41 in the first, second and fourth preferred embodiments (Examples 1 to 4) were manufactured.

TABLE 1 shows the elastic modulus and the thickness of the respective layer, a distance yc from a surface (uppermost surface) of the copper wiring layer 5 to an upper surface of the core 2, a distance yn from the surface of the copper wiring layer 5 to the neutral surface N, and a distance $\Delta y$ (yc-yn) between the neutral surface N and another surface of the core 2.

TABLE 1

| | Elastic modulus (GPa) | Example 1 (thickness and distance) (μm) | Example 2 (thickness and distance) (μm) | Example 3 (thickness and distance) (μm) | Example 4 (thickness and distance) (μm) |
|---|---|---|---|---|---|
| Copper wiring layer | 124 | 4 | 4 | 10 | 10 |
| Copper wiring base material film | 3 | 12.5 | None | 25 | 25 |

TABLE 1-continued

|  | Elastic modulus (GPa) | Example 1 (thickness and distance) (μm) | Example 2 (thickness and distance) (μm) | Example 3 (thickness and distance) (μm) | Example 4 (thickness and distance) (μm) |
|---|---|---|---|---|---|
| First clad | 1 | 10 | 15 | 20 | 20 |
| Core | 2 | 50 | 50 | 50 | 50 |
| Second clad | 1 | 20 | 20 | 20 | 10 |
| Cover film | 3 | 25 | 25 | 25 | 25 |
| Copper foil | 124 | None | None | None | 5 |
| Distance yc | — | 26.5 | 19 | 55 | 55 |
| Distance yn | — | 22.5 | 20.9 | 19.2 | 57.7 |
| Distance Δy (yc − yn) | — | 4 | −1.9 | 35.8 | −2.7 |

In the Examples 1 to 4, each of the copper wiring base material film 6 and the cover film 7 comprises a polyimide film having the elastic modulus of 3 GPa. The elastic modulus of the first clad 3A and the second clad 3B is 1 GPa, and the elastic modulus of the core 2 is 2 GPa. A thickness of the core 2 is 50 μm that is suitable for multimode transmission.

As to the Example 1 shown in TABLE 1, the method for calculating the distance Δy between the neutral surface N and the surface of the core 2 at the side near the neutral surface N will be explained in detail for two cases: (i) the reference surface S is a surface of the copper wiring layer (the uppermost layer), (ii) the reference surface S is a surface of the cover film (the lowermost layer).

Figure 6A:
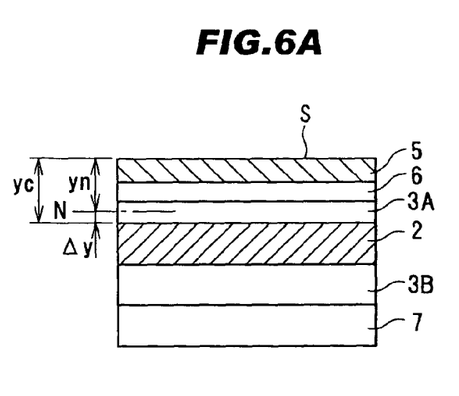
FIG. 6A is a lateral cross sectional view of the optical interconnection structure in which a reference surface S is located on a copper wiring layer.

With reference to FIG. 6A, the case (i) that the reference surface S is the surface of the copper wiring layer 5 will be explained.

FIG. 6A is a side cross sectional view of the flexible optical interconnection structure cut along a surface including a light spread direction and a laminating direction to include the core 2.

Firstly, the distance yn from the reference surface S to the neutral surface N is calculated as yn=22.5 μm based on the formula (1). Next, it is judged which region of the flexible optical interconnection structure the neutral surface N is located within, in more concrete, a region extending from the reference surface S to the first clad 3A (0 to 26.5 μm), a region within the core 2 (26.5 to 76.5 μm), or a region extending from the second clad 3B to the cover film 7 (76.5 to 121.5 μm). As a result, it is determined that the neutral surface N is located in the first clad 3A, namely, the distance Δy between the neutral surface N and the surface of the core 2 at the side near the neutral surface N is calculated as Δy=(40 μm+12.5 μm+11.0 μm)−22.5 μm=4 μm.

Figure 6B:
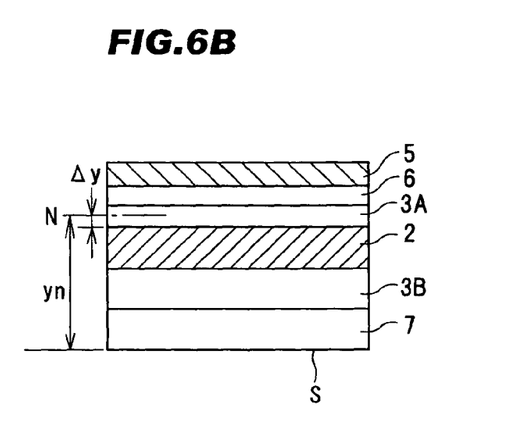
FIG. 6B is a lateral cross sectional view of the optical interconnection structure in which the reference surface S is located on a cover film.

With reference to FIG. 6B, the case (ii) that the reference surface S is the surface of the cover film 7 will be explained.

FIG. 6B is a side cross sectional view of the flexible optical interconnection structure along a surface including a light spread direction and a laminating direction to include the core 2.

Firstly, the distance yn from the reference surface S to the neutral surface N is calculated as yn=99.0 μm based on the formula (1). Next, it is judged which region the neutral surface N of the flexible optical interconnection structure is located in, in more concrete, a region extending from the reference surface S to the second clad 3B (0 to 45 μm), a region within the core 2 (45 to 95 μm), or a region extending from the first clad 3A to the copper wiring layer 5 (95 to 121.5 μm). As a result, it is determined that the neutral surface N is located in the first clad 3A, namely, the distance Δy between the neutral surface N and the surface of the core 2 at the side near the neutral surface N is calculated as Δy=99.0 μm −(25 μm+20 μm+50 μm)=4 μm.

As described above, regardless the reference surface S is provided at the uppermost surface layer or the lowermost surface layer in the drawing, the distance Δy between the neutral surface N and the surface of the core 2 at the side near the neutral surface N can be calculated unambiguously.

Figure 4:
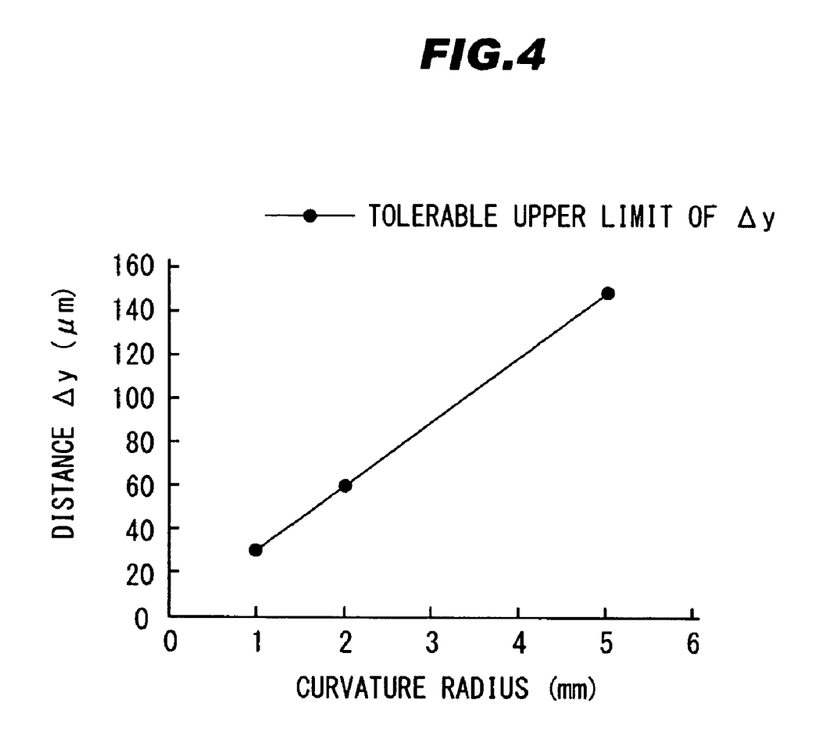
FIG. 4 is a graph showing a relationship of a tolerable curvature radius R to a distance $\Delta y$.

FIG. 4 is a graph showing a relationship of a tolerable curvature radius R to a distance Δy. In other words, FIG. 4 shows a tolerance of the distance Δy (μm) from the neutral surface N to the core 2. A tolerable upper limit of Δy (Δy=0.03×R) is plotted as a straight line in FIG. 4. As shown in FIG. 4, the distance Δy should be small when the curvature radius R is small, namely, the flexible optical interconnection structure 1, 11, 41 are bent in a large curvature. In other words, it is impossible to arrange the core 2 to be too distant from the neutral surface N. On the other hand, the distance Δy can be increased when the curvature radius R is large, namely, the flexible optical interconnection structure 1, 11, 41 is bent in a small curvature. In other words, the core 2 may be arranged to be distant from the neutral surface N.

In the Example 1, the flexible optical interconnection structure has a configuration in that the copper wiring layer 5 is provided on the copper wiring base material film 6. The distance yn from the copper wiring layer 5 to the neutral surface N is 22.5 μm, and the distance yc from the surface of the copper wiring layer 5 to the upper surface of the core 2 is 26.5 μm, so that the neutral surface N is located in vicinity of the core 2 (Δy=4 μm). When the curvature radius R is 1 mm, the distance Δy should be 30 μm or less.

Thereafter, the bending test of repeating the bending for 30000 times in the curvature radius R of 1 mm was conducted for the flexible optical interconnection structure. As a result, it is confirmed that the core 2 was not broken. Similarly, the bending test of repeating the bending for 50000 times in the curvature radius R of 2 mm was conducted for the flexible optical interconnection structure. As a result, it is confirmed that the core 2 was not broken.

In the Example 2, the flexible optical interconnection structure has a configuration in that the copper wiring layer 5 is directly provided on the first clad 3A. The distance yn from the copper wiring layer 5 to the neutral surface N is 20.9 μm, and the distance yc from the surface of the copper wiring layer 5 to the upper surface of the core 2 is 19 μm, so that the core 2 is arranged such that the core 2 includes the neutral surface N (Δy=−1.9 μm).

Thereafter, the bending test of repeating the bending for 100000 times in the curvature radius R of 2 mm was conducted for the flexible optical interconnection structure. As a result, it is confirmed that the core 2 was not broken.

In the Examples 1 and 2, the copper wiring layer 5 on the surface of the flexible optical interconnection structure is provided as a copper foil for covering an entire surface of the flexible optical interconnection structure.

However, in actual products, one or more copper wirings having a width narrower than that of the core 2 are provided, so that an area of the copper wiring (copper wiring area) is smaller than a core area. Therefore, the position of the neutral surface N is different between a region with the copper wiring and another region without the copper wiring. In the region without the copper wiring, a neutral surface $N_1$ is located at the position distant from the copper wiring. On the other hand, in the region with the copper wiring, a neutral surface $N_2$ is located at the position near the copper wiring. When the copper wiring area is smaller than the core area, an average neutral surface $N_{AVG}$ is shifted toward the core 2 side.

For the actual products, it is necessary to calculate a distance $y_{AVG}$ from the reference surface S at the copper wiring layer side to the average neutral surface $N_{AVG}$ based on an area ratio between an area of the region without copper wiring and an area of the region with copper wiring (copper wiring area), a distance $y_1$ from the reference surface S at the copper wiring layer side to the neutral surface $N_1$, and a distance $y_2$ from the reference surface S at the copper wiring layer side to the neutral surface $N_2$. Then, the core 2 is arranged such that the core 2 includes the average neutral surface $N_{AVG}$.

Alternatively, when the core 2 does not include the average neutral surface $N_{AVG}$, the core 2 is arranged to satisfy a following formula (3):

$$\Delta y_{AVG} \leq 0.03 \times R \quad (3)$$

wherein $\Delta y_{AVG}$ is a distance between the average neutral surface $N_{AVG}$ and a surface of the core 2 at a side near the average neutral surface $N_{AVG}$.

For example, when the area ratio between the region without copper wiring and the region with copper wiring is 1:1, the distance $y_{AVG}$ between the average neutral surface $N_{AVG}$ and the reference surface S at the copper wiring is calculated as $y_{AVG}=(y_1+y_2)/2$.

When the area ratio between the region without copper wiring and the region with copper wiring is 2:1, the distance $y_{AVG}$ between the average neutral surface $N_{AVG}$ and the reference surface S at the copper wiring is calculated as $y_{AVG}=(2\times y_1+y_2)/3$.

In the Example 3, the distance yn from the copper wiring layer 5 to the neutral surface N is 19.2 μm, and the distance yc from the surface of the copper wiring layer 5 to the upper surface of the core 2 is 55 μm, so that the distance Δy is 35.8 μm. When the curvature radius R is 1 mm, the distance Δy should be 30 μm or less according to the formula (2), so that the distance Δy of 35.8 μm in the Example 3 the upper limit of 30 μm. When the curvature radius R is 2 mm, the tolerable distance Δy is 60 μm or less according to the formula (2), so that the flexible optical interconnection structure in the Example 3 is applicable for practical use as the optical interconnection to be bent in the curvature radius R of not less than 2 mm.

The bending test of repeating the bending in the curvature radius R of 1 mm was conducted for the flexible optical interconnection structure in the Example 3. As a result, it is confirmed that the core 2 was broken even though the bending was less than 1000 times. However, when the curvature radius R is 2 mm, it is confirmed that the core 2 was not broken even after conducting the bending test of repeating the bending for 30000 times for the flexible optical interconnection structure.

The flexible optical interconnection structure in the Example 4 has a configuration that the counteracting metal layer 8 comprising a copper foil is provided outside the cover film 7. The neutral surface N is included in the core 2 by providing the copper foils (the copper wiring layer 5 and the counteracting metal layer 8) on both surfaces of the flexible optical interconnection structure.

In the Example 3, since the counteracting metal layer 8 comprising the copper foil is not provided in the flexible optical interconnection structure, the core 2 is distant from the neutral surface N. In the Example 4, since the counteracting metal layer 8 comprising the copper foil with a thickness of 5 μm is additionally provided, it is possible to control the position of the neutral surface N so that the neutral surface N is included in the core 2.

In the Example 4, it is therefore possible to reduce the tensile force and the compressive stress acting on the core 2 when the flexible optical interconnection structure is bent, thereby reducing the malfunction such as breakage and the like of the core 2 and improving the mechanical reliability of the flexible optical interconnection structure.

Thereafter, the bending test of repeating the bending for 50000 times in the curvature radius R of 1 mm was conducted for the flexible optical interconnection structure. As a result, it is confirmed that the core 2 was not broken. Similarly, the bending test of repeating the bending for 100000 times in the curvature radius R of 2 mm was conducted for the flexible optical interconnection structure. As a result, it is confirmed that the core 2 was not broken.

Samples of the flexible optical interconnection structure 31 in the third preferred embodiments (Examples 5 and 6) were manufactured.

TABLE 2 shows the elastic modulus and the thickness of the respective layer, a distance yc from a surface (uppermost surface) of the copper wiring layer 5 to an uppermost part of the optical fiber 32, a distance yn from the surface of the copper wiring layer 5 to the neutral surface N, and a distance Δy (yc-yn) between the neutral surface N and the uppermost part of the optical fiber 32.

As shown in TABLE 2, the neutral surface N is located within the optical fiber 32 in the Examples 5 and 6.

TABLE 2

|  | Elastic modulus (GPa) | Example 5 (thickness and distance) (μm) | Example 6 (thickness and distance) (μm) |
|---|---|---|---|
| Copper wiring layer | 124 | 5 | 10 |
| Copper wiring base material film | 3 | 50 | 25 |
| Adhesive | 0.5 | 3 | 3 |
| Optical fiber | 94 | 125 | 125 |
| Adhesive | 0.5 | 3 | 3 |
| Cover film | 3 | 50 | 25 |
| Distance yc | — | 58 | 38 |
| Distance yn | — | 114.7 | 91 |
| Distance Δy (yc − yn) | — | −56.7 | −53 |

As described above, it is possible to adjust the position of the neutral surface N to be within the optical fiber 32 or in vicinity of the optical fiber 32 by controlling the elastic modulus and the thickness of the respective layers in the flexible optical interconnection structure. According to this structure, it is possible to reduce the tensile force and the compressive stress acting on the optical fiber 32 when the flexible optical interconnection structure is bent, thereby reducing the malfunction such as breakage and the like of the optical fiber 32 and improving the mechanical reliability of the flexible optical interconnection structure.

Although the invention has been described with respect to the specific embodiments for complete and clear disclosure, the appended claims are not to be therefore limited but are to be construed as embodying all modifications and alternative constructions that may occur to one skilled in the art which fairly fall within the basic teaching herein set forth.

What is claimed is:

1. A flexible optical interconnection structure, comprising:
a plurality of layers including an optical waveguide comprising a core and a clad,
wherein the core is disposed to include a neutral surface that is not affected by expansion or contraction by bending, wherein the neutral surface is located at a position distant by a distance yn from an innermost surface when bent, the distance yn is expressed by a formula (1):

$$y_n = \frac{\sum_{i=1}^{n} E_i t_i y_i}{\sum_{i=1}^{n} E_i t_i} \qquad (1)$$

wherein a distance $y_i$ between a surface layer and a center of i-th layer (i is a natural number) in a thickness direction, an elastic modulus of the i-the layer is $E_i$, and a thickness of the i-the layer is $t_i$.

2. The flexible optical interconnection structure according to claim 1, wherein the layers include an electric wiring layer.

3. The flexible optical interconnection structure according to claim 1, wherein the optical waveguide comprises a polymer waveguide.

4. The flexible optical interconnection structure according to claim 1, wherein the optical waveguide comprises an optical fiber.

5. The flexible optical interconnection structure according to claim 1, wherein a metal layer is provided at a side opposite to the electric wiring layer.

6. A flexible optical interconnection structure, comprising:
a plurality of layers including an optical waveguide comprising a core and a clad,
wherein the core is disposed to satisfy:

$\Delta y \leq 0.03 \times R$, wherein $\Delta y$ is a distance between a neutral surface that is not affected by expansion or contraction by bending and a surface of the core at a side near the neutral surface, and R is a curvature radius of an innermost surface of the flexible optical interconnection structure in the bent state.

7. The flexible optical interconnection structure according to claim 6, wherein the neutral surface is located at a position distant by a distance yn from the surface of the core, the distance yn is expressed by a formula (1):

$$y_n = \frac{\sum_{i=1}^{n} E_i t_i y_i}{\sum_{i=1}^{n} E_i t_i} \qquad (1)$$

wherein a distance $y_i$ between a surface layer and a center of i-th layer (i is a natural number) in a thickness direction, an elastic modulus of the i-the layer is $E_i$, and a thickness of the i-the layer is $t_i$.

8. The flexible optical interconnection structure according to claim 6, wherein the layers include an electric wiring layer.

9. The flexible optical interconnection structure according to claim 6, wherein the optical waveguide comprises a polymer waveguide.

10. The flexible optical interconnection structure according to claim 6, wherein the optical waveguide comprises an optical fiber.

11. The flexible optical interconnection structure according to claim 6, wherein a metal layer is provided at a side opposite to the electric wiring layer.

12. The flexible optical interconnection structure according to claim 6, wherein the neutral surface is positioned outside the core.

13. A method for fabricating a flexible optical interconnection structure, comprising:
providing a plurality of layers including an optical waveguide comprising a core and a clad;
calculating a distance yn from an innermost surface when bent to a neutral surface that is not affected by expansion or contraction by bending, based on an elastic modulus and a thickness of each of the layers;
calculating the position of the neutral surface based on the distance yn; and
controlling the position of the neutral surface by adjusting the elastic modulus and the thickness of each of the layers, such that the core includes the neutral surface.

14. The method for fabricating the flexible optical interconnection structure, according to claim 13, wherein the distance yn is calculated by a formula (1):

$$y_n = \frac{\sum_{i=1}^{n} E_i t_i y_i}{\sum_{i=1}^{n} E_i t_i}. \qquad (1)$$

wherein a distance $y_i$ between a surface layer and a center of i-th layer (i is a natural number) in a thickness direction, an elastic modulus of the i-the layer is $E_i$, and a thickness of the i-the layer is $t_i$.

15. A method for fabricating a flexible optical interconnection structure, comprising:
providing a plurality of layers including an optical waveguide comprising a core and a clad;
calculating a distance yn from an innermost surface when bent to a neutral surface that is not affected by expansion or contraction by bending, based on an elastic modulus and a thickness of each of the layers;
calculating the position of the neutral surface based on the distance yn; and
controlling the position of the neutral surface by adjusting the elastic modulus and the thickness of each of the layers, such that the wherein the core is disposed to satisfy:

$\Delta y \leq 0.03 \times R$, wherein $\Delta y$ is a distance between the neutral surface and a surface of the core at a side near the neutral surface, and R is a curvature radius of an innermost surface of the flexible optical interconnection structure in the bent state.

16. The method for fabricating the flexible optical interconnection structure, according to claim 15, wherein the distance yn is calculated by a formula (1):

$$y_n = \frac{\sum_{i=1}^{n} E_i t_i y_i}{\sum_{i=1}^{n} E_i t_i} \qquad (1)$$

wherein a distance $y_i$, between a surface layer and a center of i-th layer (i is a natural number) in a thickness direction, an elastic modulus of the i-the layer is $E_i$, and a thickness of the i-the layer is $t_i$.

* * * * *